Patented Mar. 30, 1954

2,673,883

UNITED STATES PATENT OFFICE

2,673,883

METHOD FOR THE RECOVERY OF BENZENE HEXACHLORIDE OF ENHANCED GAMMA ISOMER CONTENT

Philip F. Tryon, Terre Haute, Ind., assignor to Commercial Solvents Corporation, Terre Haute, Ind., a corporation of Maryland No Drawing. Application December 8, 1949, Serial No. 131,899

6 Claims. (Cl. 260—648)

My invention relates to a method for producing benzene hexachloride of enhanced gamma isomer content.

Benzene hexachloride, which is also known as 1,2,3,4,5,6-hexachlorocyclohexane, is ordinarily produced by reacting benzene in the liquid phase with chlorine in such a manner as to promote the addition of the chlorine to benzene. This reaction gives rise to the formation of five isomeric benzene hexachlorides known as the alpha, beta, gamma, delta, and epsilon isomers, these isomers being present in the mixture in varying quantities and possessing different properties and utilities. To date the most important use of the benzene hexachlorides is as insecticides, parasiticides, etc. Unfortunately, however, only the gamma isomer is particularly effective for this purpose and, being present in the primary reaction product in amounts ranging customarily from approximately 10 to 20% of the total reaction mixture, it is for many purposes desirable to separate the gamma isomer from the remaining isomers or to enhance the gamma isomer content in the mixture of isomers produced. As in the case of most isomeric compounds, a separation or enhancement of this character presents numerous difficulties.

In the past the gamma isomer of benzene hexachloride has been produced in several different ways. These processes, however, have been costly and have produced an unsatisfactory product. One of the more important of these processes is described in British Patent 586,439 by Cooke et al. and consists of dissolving the crude benzene hexachloride in a solvent in which the gamma isomer has a high solubility, and one or all the other isomers a low solubility. This produces a product containing only from 20–66% gamma isomer. Another method is reported by Slade in Chemistry and Industry, 314 (1945). Slade shows the isolation of the pure gamma isomer by treating the crude benzene hexachloride with methanol, in which the alpha and beta isomers are relatively insoluable, separating the solid product, leaving a solution of primarily gamma and delta isomers, evaporating this solution and obtaining a small amount of substantially pure gamma isomer. The pure gamma isomer of benzene hexachloride is then prepared by re-crystallization of the substantially pure isomer from chloroform.

In my copending application, Serial No. 131,898 filed December 8, 1949, I have disclosed a method for the production of the substantially pure gamma isomer of benzene hexachloride by dissolving a mixture of isomers of benzene hexachloride of enhanced gamma isomer content in a solvent selected from the group consisting of dioxane, tetrahydrofuran, tetrahydropyran, dioxolane, and 2-methyldioxolane, and crystallizing from such solution the gamma isomer or a solvate complex which decomposes into the gamma isomer. This process produces good yields of the substantially pure gamma isomer which is highly desirable for insecticidal sprays due to the fact that it is odorless. In applications where the gamma isomer is to be used in dust, or in other forms wherein the odor is not a factor, and wherein the pure gamma isomer would be diluted to a low percentage, a material which is not pure gamma isomer is highly satisfactory. I have now discovered a process which besides producing the pure gamma isomer, also produces a mixture of isomers, the gamma isomer content of which can be varied to suit the needs of the consumer. It leaves a crude mixture of isomers containing from 10% to 12% of the gamma isomer which concentration is adequate for many purposes, such as insecticide dusts.

By means of my process, approximately 15% of the gamma isomer content of the crude benzene hexachloride is extracted as the substantially pure gamma isomer of benzene hexachloride, approximately 5% of the gamma isomer content of the crude benzene hexachloride being extracted as a high gamma mixture of isomers containing approximately 40% gamma isomer, and approximately 75% of the gamma isomer content of the crude benzene hexachloride is left in the crude mixture of isomers.

In carrying out my process, I start with crude benzene hexachloride of which approximately 14% is the gamma isomer. This material is produced by one of the known methods of carrying out the chlorination of benzene or by any other method known to the art.

In carrying out my invention, I first slurry the crude benzene hexachloride with a solvent selected from the group consisting of alkanes and cycloalkanes containing from 5 to 8 carbon atoms. I then remove the undissolved crude benzene hexachloride of which approximately 10–12% is the gamma isomer and distill the remaining solution to remove the solvent. The residue from the distillation, as disclosed in my copending application Serial No. 131,898 filed December 8, 1949, is dissolved in a solvent in which the solubility ratio of the gamma isomer of benzene hexachloride to the alpha isomer of benzene hexachloride is 2 or less, such as for example 1,4-dioxane, tetrahydropyran, tetrahydrofuran, dioxolane, and 2-methyldioxolane. After solution of the mixture of isomers in the solvent, the gamma isomer is crystallized therefrom. The crystals which form are a complex of the gamma isomer of benzene hexachloride and solvent when 1,4-dioxane is used, and substantially pure gamma isomer of benzene hexachloride when the other above-mentioned solvents are used. The mother liquor, after removal of the crystals is then distilled to remove the solvent, and the residue is dissolved in a lower aliphatic alcohol containing from 1 to 4 carbon atoms. The solution is subjected to crystallization and a mixture of crystals of isomers of benzene hexachloride obtained of which approximately 40% is the gamma isomer.

It can thus be seen that in carrying out my process three fractions are obtained all of which contain the gamma isomer of benzene hexachloride in effective amounts. My process therefore effects a saving of materials since all three products are readily usable as such, and at the same time provides the trade with benzene hexachloride containing varying amounts of the gamma isomer suitable for different uses.

The amount of solvent used in my process to slurry the crude benzene hexachloride has been found to vary from 0.5 to 1.0 ml. of solvent per gram of crude benzene hexachloride, the amount depending upon the particular solvent employed with amounts near the lower limit being used for the solvents in which benzene hexachloride is more soluble, such as for example cyclohexane, and amounts near the upper limit being used for solvents in which benzene hexachloride is more insoluble, such as for example hexane. When using 80–100° C. aliphatic naptha, heptane, and petroleum ether, the optimum amount of solvent to be used is the median amount of 0.75 ml. per gram of crude benzene hexachloride. Improper amounts of solvent at this stage of the process affect the amount of gamma isomer produced as the substantially pure material and as the high gamma mixture of isomers. If an insufficient amount of the benzene hexachloride goes into solution, smaller amounts of pure gamma and high gamma mixtures will result. The converse is also true since, if too much benzene hexachloride goes into solution then larger amounts of pure gamma and high gamma mixtures result. The disadvantage of this lies in the fact that the amount of gamma isomer left in the crude is below the amount considered to be the minimum gamma isomer content of benzene hexachloride for effective commercial use.

Slurrying is continued until a saturated solution of benzene hexachloride is obtained. The undissolved benzene hexachloride is then removed by any suitable means such as filtration, and the filtrate subsequently steam-distilled up to a liquid temperature of approximately 100° C. to remove the solvent. The residue is an oily, crystalline mixture of isomers of benzene hexachloride.

After the undissolved benzene hexachloride has been removed from the solution and after the solvent has been distilled off, the residue is dissolved in a solvent selected from the group consisting of 1,4-dioxane, tetrahydrofuran, tetrahydropyran, dioxolane, and 2-methyldioxolane. As noted above, this step is disclosed in my copending application Serial No. 131,898 filed December 8, 1949. The amount of solvent to be used is at least 0.2 ml. per gram of the mixture of isomers. The preferred amount has been found to be from 0.2 to 0.8 ml. per gram of the mixture of isomers.

After solution of the material in the solvent selected from the group consisting of dioxane, tetrahydrofuran, tetrahydropyran, dioxolane, and 2-methyldioxolane, crystallization is effected by cooling the solution to from 15° to 25° C. Slightly better yields are realized by adjusting the temperature toward the lower limit of the suggested temperature range for crystallization. The crystals are recovered by any suitable means, such as filtration or centrifugation.

The crystals which form are a solvate complex known as bis-(gamma benzene hexachloride) 1,4-dioxane if dioxane is used and substantially pure gamma isomer when any of the other solvents are used. In the case of the solvate complex, the crystals upon standing in air decompose into the gamma isomer of benzene hexachloride and dioxane, so that the substantially pure gamma isomer of benzene hexachloride is obtained when any of the solvents are used merely by drying the crystals.

After crystallization to obtain the substantially pure gamma isomer of benzene hexachloride, and after removal of the crystals, the mother liquor is distilled to remove the crystallization solvent and the residue is dissolved in a lower aliphatic alcohol containing from 1 to 4 carbon atoms. Of these solvents I prefer to use 2-propanol and for best results I have found that an aqueous 91% solution of 2-propanol should be used. In any case an aqueous solution of from 85% to 95% alcohol gives better results than the alcohol alone.

The amount of alcohol to be used is approximately 1.0 ml. per gram of mother liquor oil. However, amounts ranging from 0.5 ml. to 2.0 ml. of alcohol per gram of mother liquor oil are operative in my process.

The alcohol solution containing the mother liquor oil is then cooled to 15–25° C. for crystallization of the high gamma mixture of isomers of benzene hexachloride.

For crystallization of the high gamma mixture of isomers of benzene hexachloride, the solution need not be cooled below room temperature. If the solution is cooled to room temperature, crystallization will be complete in less than one hour. The crystals can be recovered by any of the known methods, such as for example filtration or centrifugation.

The alcohol used in the crystallization of the high gamma mixture of isomers of benzene hexachloride can be recovered by distilling the final mother liquor. The recovered alcohol can be recycled and used again in the crystallization of the high gamma mixture of isomers of benzene hexachloride and thus an appreciable saving in the cost of materials is effected.

In carrying out my process, I prefer to slurry the crude benzene hexachloride with 80–100° C. aliphatic naptha for approximately one hour at room temperature. I then filter out the undissolved benzene hexachloride and steam-distill the filtrate up to a liquid temperature of 100° C. to remove the naptha. I then dissolve the residual oil in 0.33 ml. of dioxane per gram of residual oil and cool the solution to approximately 15° C. to crystallize bis-(gamma-benzene hexachloride) 1,4-dioxane. The crystals are removed, spread out and dried in air so as to effect decomposition to the substantially pure gamma isomer and 1,4-dioxane. The mother liquor after crystallization of the solvate complex is then steam-distilled up to 100° C. to remove the dioxane and the residual oil is dissolved in 1 ml. of 91% isopropyl alcohol per gram of oil. The mixture is allowed to stand at room temperature until crystallization of the high gamma mixture of isomers of benzene hexachloride takes place. The crystals are removed by filtration and the final mother liquor is distilled to recover the isopropyl alcohol. It is to be understood that I am not to be limited to the preferred embodiment as shown.

The following examples are offered to show specific embodiments of my invention, but they too are not to be considered as limiting the scope of my invention to the examples as shown.

EXAMPLE I

A 2000-gram portion of crude benzene hexachloride containing 13.8% of the gamma isomer was slurried for one hour with 2000 ml. of 80–100° C. aliphatic naptha. The slurry was then filtered and the cake of recovered crude material was dried. The filtrate was steam distilled to a liquid temperature of 100° C. and the residual oil was dissolved in 0.33 ml. of dioxane per gram of residual oil. The solution was cooled to 18° C. and crystallized. The crystals were filtered off, washed and air dried to obtain the substantially pure gamma isomer of benzene hexachloride. The mother liquor was steam-distilled to a liquid temperature of about 100° C. to remove the dioxane and the residual oil was dissolved in 1 ml. of 91% isopropyl alcohol per gram of residual oil. The solution was allowed to stand at room temperature until crystallization took place. The crystals were filtered off, washed, and dried to obtain the high gamma mixture of isomers of benzene hexachloride. The results of the experiment are shown in Table I.

Table I

| Fraction | Gamma isomer in fraction | Total gamma isomer recovered |
|---|---|---|
| | Percent | Percent |
| Recovered crude | 11.8 | 74 |
| Substantially pure gamma | 99 | 14 |
| High gamma mixture | 46 | 8 |
| Total gamma isomer recovered | | 96 |

EXAMPLE II

A 2000-gram portion of crude benzene hexachloride containing 14.1% of the gamma isomer was slurried for one hour with 1500 ml. of hexane. The slurry was filtered and the cake of recovered crude material was dried. The filtrate was distilled and the residual oil was dissolved in 0.33 ml. of dioxane per gram of residual oil. The solution was cooled to 18° C. and crystallized. The crystals were filtered off, washed, and air dried to obtain the substantially pure gamma isomer of benzene hexachloride. The mother liquor was distilled and the residual oil was dissolved in 1 ml. of 91% isopropyl alcohol per gram of residual oil. The solution was allowed to stand at room temperature until crystallization took place and the crystals were then filtered off, washed, and dried to obtain the high gamma mixture of isomers of benzene hexachloride. The results are shown in Table II.

Table II

| Fraction | Gamma isomer in fraction | Total gamma isomer recovered |
|---|---|---|
| | Percent | Percent |
| Recovered crude | 12.2 | 78 |
| Substantially pure gamma | 99 | 10 |
| High gamma mixture | 38 | 4 |
| Total gamma isomer recovered | | 92 |

EXAMPLE III

A 2000-gram portion of crude benzene hexachloride containing 13.8% gamma isomer was slurried with 1500 ml. of isoheptane. The process was then continued as in Example II. The results are shown in Table III.

Table III

| Fraction | Gamma isomer in fraction | Total gamma isomer recovered |
|---|---|---|
| | Percent | Percent |
| Recovered crude | 11.3 | 82 |
| Substantially pure gamma | 99 | 11 |
| High gamma mixture | 44 | 6 |
| Total gamma isomer recovered | | 99 |

EXAMPLE IV

A 2000-gram portion of crude benzene hexachloride containing 13.8% gamma isomer was slurried with 2000 ml. of pentane. The process was then continued as in Example II. The results are shown in Table IV.

Table IV

| Fraction | Gamma isomer in fraction | Total gamma isomer recovered |
|---|---|---|
| | Percent | Percent |
| Recovered crude | 12.5 | 85 |
| Substantially pure gamma | 99 | 5 |
| High gamma mixture | 37 | 2 |
| Total gamma isomer recovered | | 92 |

EXAMPLE V

A 2000-gram portion of crude benzene hexachloride containing 13.8% gamma isomer was slurried with 2000 ml. of 30–75° C. petroleum ether. The process was continued as in Example II. The results are shown in Table V.

Table V

| Fraction | Gamma isomer in fraction | Total gamma isomer recovered |
|---|---|---|
| | Percent | Percent |
| Recovered crude | 12.4 | 83 |
| Substantially pure gamma | 99 | 6 |
| High gamma mixture | 35 | 3 |
| Total gamma isomer recovered | | 92 |

EXAMPLE VI

A 2000-gram portion of crude benzene hexachloride containing 13.8% gamma isomer was slurried with 2000 ml. of cyclohexane. The process was continued as in Example II, except that methyl alcohol was used instead of isopropyl alcohol to crystallize the high gamma mixture of isomers of benzene hexachloride. The results are shown in Table VI.

Table VI

| Fraction | Gamma isomer in fraction | Total gamma isomer recovered |
|---|---|---|
| | Percent | Percent |
| Recovered crude | 11.1 | 68 |
| Substantially pure gamma | 99 | 17 |
| High gamma mixture | 49 | 12 |
| Total gamma isomer recovered | | 97 |

EXAMPLE VII

A 2000-gram portion of crude benzene hexachloride containing 13.9% of the gamma isomer was slurried for one hour with 1500 ml. of hexane. The slurry was filtered and the cake of recovered crude material was dried. The filtrate was distilled and the residual oil was dissolved in 0.33 ml. of 2-methyldioxolane per gram of residual oil. The solution was cooled at 18° C. and crystallized. The crystals of substantially pure gamma isomer were filtered off, washed and dried. The mother liquor was distilled and the residual oil was dissolved in 1 ml. of 91% isopropyl alcohol per gram of residual oil. The solution was allowed to stand at room temperature until crystallization took place and the crystals were then filtered off, washed, and dried to obtain the high gamma mixture of isomers of benzene hexachloride. The results are shown in Table VII.

*Table VII*

| Fraction | Gamma isomer in fraction | Total gamma isomer recovered |
|---|---|---|
|  | Percent | Percent |
| Recovered crude | 12.1 | 78 |
| Substantially pure gamma | 93 | 6 |
| High gamma mixture | 39 | 6 |
| Total gamma isomer recovered |  | 90 |

What I claim is:

1. An improvement in a process for the production of benzene hexachloride which comprises slurrying crude benzene hexachloride with from 0.5 to 1.0 ml. petroleum ether per gram of benzene hexachloride, removing undissolved benzene hexachloride, distilling the petroleum ether from the solution, dissolving the residue in from 0.2 to 0.8 ml. 1,4-dioxane per gram of residue, cooling to crystallize bis-(gamma benzene hexachloride) 1,4-dioxane, recovering the crystals, distilling the mother liquor to remove the solvent, dissolving the residue in from 0.5 to 2.0 ml. 91% isopropyl alcohol per gram of residue, and crystallizing therefrom benzene hexachloride of enhanced gamma isomer content.

2. An improvement in a process for the production of benzene hexachloride which comprises slurrying crude benzene hexachloride with from 0.5 to 1.0 ml. cyclohexane per gram of benzene hexachloride, removing undissolved benzene hexachloride, distilling the cyclohexane from the solution, dissolving the residue in from 0.2 to 0.8 ml. 1,4-dioxane per gram of residue, cooling to crystallize bis-(gamma benzene hexachloride) 1,4-dioxane, recovering the crystals, distilling the mother liquor to remove the solvent, dissolving the residue in from 0.5 to 2.0 ml. 91% methyl alcohol per gram of residue, and crystallizing therefrom benzene hexachloride of enhanced gamma isomer content.

3. An improvement in a process for the production of benzene hexachloride which comprises slurrying crude benzene hexachloride with from 0.5 ml. to 1.0 ml. per gram of benzene hexachloride of a solvent selected from the group consisting of alkanes containing from 5 to 8 carbon atoms and cycloalkanes containing from 5 to 8 carbon atoms at a temperature of from 20° to 30° C., removing undissolved benzene hexachloride, distilling the solvent from the solution, dissolving the residue in from 0.2 ml. to 0.8 ml. per gram of residue of 1,4-dioxane, cooling to crystallize bis-(gamma benzene hexachloride) 1,4-dioxane, recovering the crystals, distilling the solvent from the mother liquor, dissolving the residue in from 0.5 to 2.0 ml. per gram of residue of a lower aliphatic alcohol having from 1 to 4 carbon atoms and separating therefrom crystalline benzene hexachloride of enhanced gamma isomer content.

4. An improvement in a process for the production of benzene hexachloride which comprises slurrying crude benzene hexachloride with from 0.5 to 1.0 ml. of 80–100° C. aliphatic naptha per gram of benzene hexachloride at a temperature of from 20° to 30° C., removing undissolved benzene hexachloride, distilling the solution to remove the naptha, dissolving the residue in from 0.2 ml. to 0.8 ml. of 1,4-dioxane per gram of residue, cooling to from 15° to 25° C. to crystallize bis-(gamma benzene hexachloride) 1,4-dioxane, recovering the crystals, distilling the solvent from the mother liquor, dissolving the residue in from 0.5 to 2.0 ml. of 91% isopropyl alcohol per gram of mother liquor residue and separating therefrom crystalline benzene hexachloride of enhanced gamma isomer content.

5. An improvement in a process for the production of benzene hexachloride which comprises slurrying crude benzene hexachloride with from 0.5 to 1.0 ml. of cyclohexane per gram of benzene hexachloride at a temperature of from 20° to 30° C., removing undissolved benzene hexachloride, distilling the solution to remove the cyclohexane, dissolving the residue in from 0.2 ml. to 0.8 ml. of 1,4-dioxane per gram of residue, cooling to from 15° to 25° C. to crystallize bis-(gamma benzene hexachloride) 1,4-dioxane, recovering the crystals, distilling the solvent from the mother liquor, dissolving the residue in from 0.5 to 2.0 ml. of 91% methyl alcohol per gram of mother liquor residue and separating therefrom crystalline benzene hexachloride of enhanced gamma isomer content.

6. An improvement in a process for the production of benzene hexachloride which comprises slurrying crude benzene hexachloride with from 0.5 to 1.0 ml. petroleum ether per gram of benzene hexachloride, removing undissolved benzene hexachloride, distilling the petroleum ether from the solution, dissolving the residue in from 0.2 to 0.8 ml. 1,4-dioxane per gram of residue, cooling to crystallize bis-(gamma benzene hexachloride) 1,4-dioxane, recovering the crystals, distilling the mother liquor to remove the solvent, dissolving the residue in from 0.5 to 2.0 ml. 91% methyl alcohol per gram of residue, and crystallizing therefrom benzene hexachloride of enhanced gamma isomer content.

PHILIP F. TRYON.

References Cited in the file of this patent

UNITED STATES PATENTS

| Number | Name | Date |
|---|---|---|
| 2,438,900 | Cooke et al. | Apr. 6, 1948 |

FOREIGN PATENTS

| Number | Country | Date |
|---|---|---|
| 471,941 | Belgium | April 1947 |
| 573,693 | Great Britain | Dec. 3, 1945 |

OTHER REFERENCES

Slade, "Chemistry and Industry," Oct. 13, 1945, pp. 315–16.